(12) United States Patent
Benjamin et al.

(10) Patent No.: US 11,132,140 B1
(45) Date of Patent: Sep. 28, 2021

(54) PROCESSING MAP METADATA UPDATES TO REDUCE CLIENT I/O VARIABILITY AND DEVICE TIME TO READY (TTR)

(71) Applicant: Seagate Technology LLC, Fremont, CA (US)

(72) Inventors: Daniel John Benjamin, Savage, MN (US); Ryan James Goss, Prior Lake, MN (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 15/929,307

(22) Filed: Apr. 24, 2020

(51) Int. Cl.
*G06F 3/06* (2006.01)

(52) U.S. Cl.
CPC ............ *G06F 3/065* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,111,136 B2 * | 9/2006 | Yamagami | G06F 11/1471 707/999.202 |
| 7,685,378 B2 * | 3/2010 | Arakawa | G06F 11/1471 711/154 |
| 7,769,945 B2 | 8/2010 | Lasser et al. | |
| 8,352,706 B2 | 1/2013 | Yano et al. | |
| 8,793,429 B1 | 7/2014 | Call et al. | |
| 9,195,583 B2 * | 11/2015 | Jung | G06F 12/0246 |
| 9,411,717 B2 | 8/2016 | Goss et al. | |
| 9,672,113 B1 * | 6/2017 | Rodrigues | G06F 11/1448 |
| 9,804,928 B2 | 10/2017 | Davis et al. | |
| 9,904,607 B2 | 2/2018 | Camp et al. | |
| 10,120,797 B1 * | 11/2018 | Foley | G06F 3/0619 |
| 2005/0081099 A1 * | 4/2005 | Chang | G06F 11/1466 714/15 |
| 2014/0115232 A1 * | 4/2014 | Goss | G06F 11/1471 711/103 |
| 2016/0154594 A1 * | 6/2016 | Kang | G06F 3/0688 711/103 |

* cited by examiner

*Primary Examiner* — Elias Mamo
(74) *Attorney, Agent, or Firm* — Hall Estill Law Firm

(57) ABSTRACT

Method and apparatus for enhancing performance of a storage device, such as a solid-state drive (SSD). A non-volatile memory (NVM) stores user data from a client device. Map metadata in a local memory describes locations of the user data in the NVM. The map metadata is arranged as a snapshot and accumulated journal updates. A metadata manager circuit combines a first portion of the journal updates with the existing snapshot to generate a new snapshot, and places a second portion of the journal updates into a read-only journal table in accordance with a selected metadata journaling strategy. A controller uses the updated snapshot and the table to service subsequently received client commands. Only dirty entries are processed and are written at the slowest acceptable rate, thereby improving client I/O performance during normal operation and time to ready (TTR) performance of the device during initialization.

20 Claims, 8 Drawing Sheets

DATA FLOW

METADATA (MAP) FORMAT

PROCESSING MAP METADATA UPDATES TO REDUCE CLIENT I/O VARIABILITY AND DEVICE TIME TO READY (TTR)

SUMMARY

Various embodiments of the present disclosure are generally directed to a method and apparatus for enhancing performance of a storage device, such as a solid-state drive (SSD).

In some embodiments, a non-volatile memory (NVM) stores user data from a client device. Map metadata in a local memory is used to describe locations of the user data in the NVM. The map metadata is arranged as a snapshot and accumulated journal updates. A metadata manager circuit combines a first portion of the journal updates with the existing snapshot to generate a new snapshot, and places a second portion of the journal updates into a read-only journal table. A journal update list is generated to identify the updates in the table. A controller thereafter uses the updated snapshot and the table to service subsequently received client commands.

These and other features and advantages which characterize the various embodiments of the present disclosure can be understood in view of the following detailed discussion and the accompanying drawings.

DETAILED DESCRIPTION

Figure 1A:
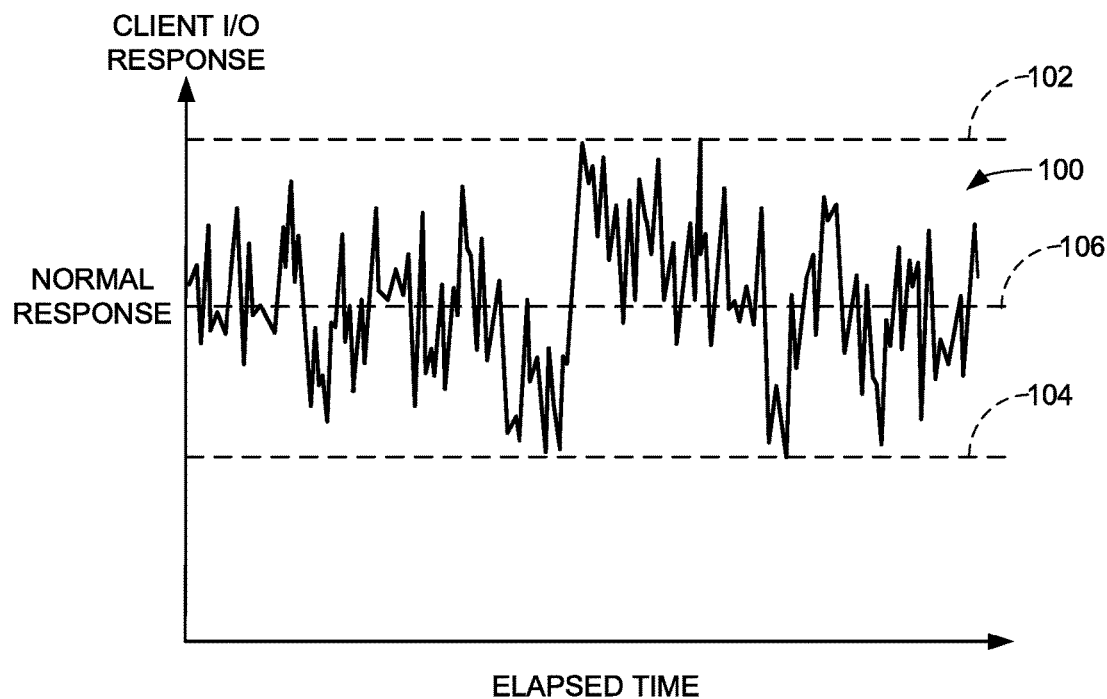
FIGS. 1A and 1B are graphical representations of client input/output (I/O) responses obtained during normal and compensated modes of a storage device constructed and operated in accordance with various embodiments of the present disclosure.

The present disclosure generally relates to managing data I/O performance of a data storage device, such as but not limited to a solid-state drive (SSD).

Storage devices generally include a controller and non-volatile memory (NVM). The controller communicates with a host (client) device to manage the storage and retrieval of user data to and from the NVM. Solid-state drives (SSDs) are one form of storage device that use solid-state semiconductor memory, such as NAND flash, to store the user data. The flash is often arranged as a number of flash semiconductor dies that are accessible via channels (lanes).

NAND flash, as well as certain other forms of semiconductor memory, tend to require an intervening erasure operation before new data can be written to a given location. New versions of a given set of user data blocks from the client are written to a new location within the NVM, rather than being overwritten to an existing location that stores the older version blocks. Mapping data structures (metadata) are maintained to identify the locations of the most current versions of the data. Garbage collection (GC) operations are used to relocate current versions of data and erase older (stale) versions to reclaim the memory locations for subsequent use in storing new data. GC operations may be carried out on a GCU (garbage collection unit) basis, which may be formed from multiple erasure blocks that span a collection of different dies and which are allocated and erased as a unit.

It follows that storage devices with erasable memories can have a significant background processing overhead. The controller not only operates to service pending client read and write commands, but also performs metadata updates and GC operations while maintaining a desired operational data transfer performance level (and available storage capacity) for the client.

It is generally desirable to initialize a storage device such as an SSD from a powered down state to an operationally ready state in a fast and efficient manner. This initialization time is sometimes referred to as "Time to Ready," or "TTR." One of the actions that can take a significant amount of time during this initialization phase is to locate and load the metadata that describes the system to a local memory, such as DRAM, for access by the controller. The loaded metadata may be arranged as a metadata map table. The greater the capacity of the NVM, the greater the amount of metadata that will be needed to describe the contents of the NVM.

To give one nonlimiting example, each terabyte, TB ($10 \times 10^{12}$ bytes) of flash in an SSD may require one gigabyte, GB ($10 \times 10^9$ bytes) or more of metadata to describe the contents of that 1 TB of flash, depending on the metadata granularity. As will be appreciated, loading several gigabytes of memory, even into a fast volatile memory such as DRAM, can take an appreciable amount of time. Planned continued increases in SSD capacity (e.g., 16 TB, 32 TB, etc.) will only serve to exasperate this problem.

A related factor that can extend the required TTR is that FTL metadata may be divided up into segments that describe different portions of the flash memory. Each of the segments may be stored to different locations (e.g., die/channel combinations) to enhance reliability and facilitate parallel transfer. It is common to arrange the FTL metadata as a series of periodic snapshots with intervening journal updates. The journal updates show changes made since the most recent snapshot. Hence, the metadata loading process may require combining the snapshots with the updates to arrive at the most current version of the state of the system. Such updates may need to take place serially (e.g., one after another) rather than in parallel. Generally, the metadata needs to be successfully loaded before the SSD (or other storage device) can begin servicing client data transfer commands during normal operation.

Various embodiments of the present disclosure are accordingly directed to an apparatus and method for enhancing client data transfer rate performance in a storage device through the efficient management of metadata map updates. The storage device may take the form of a solid-state drive (SSD), although other storage configurations, including multi-device arrays, are contemplated as well.

The disclosed solution generally involves adaptively adjusting the rate at which journal updates for the map data are generated. In some cases, the form and granularity of the journal updates may be adjusted as well. The size and rate of journaling is selected based on one or more detected parameters, such as workload encountered by the system.

Generally, a client workload of sequential writes can tolerate fewer journals and less frequent updates that a workload of random writes and reads. Accordingly, the system detects the current workload and uses this to trigger an appropriate runtime journaling configuration. Different sections (chunks) of a metadata table used to describe the system can incorporate different metadata configurations best suitable for the associated user data.

Adaptively adjusting the metadata configurations used for different locations/data sets can enhance power down (scram) efficiency, decrease time to ready (TTR), and reduce background resources required during normal operation of the device.

These and other features and advantages of various embodiments can be understood beginning with a review of FIG. 1A which provides a graphical representation of a response curve 100. The curve 100 represents a typical client input/output (I/O) response by an exemplary data storage device in a normal (uncompensated) mode of operation. The response can be measured in a number of ways, such as completion rates to complete a sequence of client access commands (e.g., read commands, write commands, status commands, flush commands, etc.) issued by a client device to a data storage device. As such, the numbers can represent command completion times, the number of commands completed over successive intervals of time, or any other suitable metric useful in adjudging storage device performance as observed from the client standpoint.

A significant amount of variability is present in the client I/O response curve 100. A first upper threshold 102 represents a maximum response (such as faster performance) and a lower threshold 104 represents a minimum response (such as slower performance). Line 106 represents an average completion response level for the overall depicted interval.

It can be seen from a review of curve 100 that significant variations occur with respect to the overall range between the maximum and minimum levels (e.g., the vertical separation distance between lines 102 and 104). Further variations can be seen as "drifting" by the storage device over time as the performance successively trends up and down along different portions of the curve.

These and other forms of variations in client I/O response can be deleterious from a client standpoint, since the client may be involving multiple data exchanges with multiple devices as well as carrying out other computations to complete a larger task. In order for the upstream work to be completed in an acceptable manner, downstream performance of the storage device should normally be as consistent as possible over time.

Figure 1B:
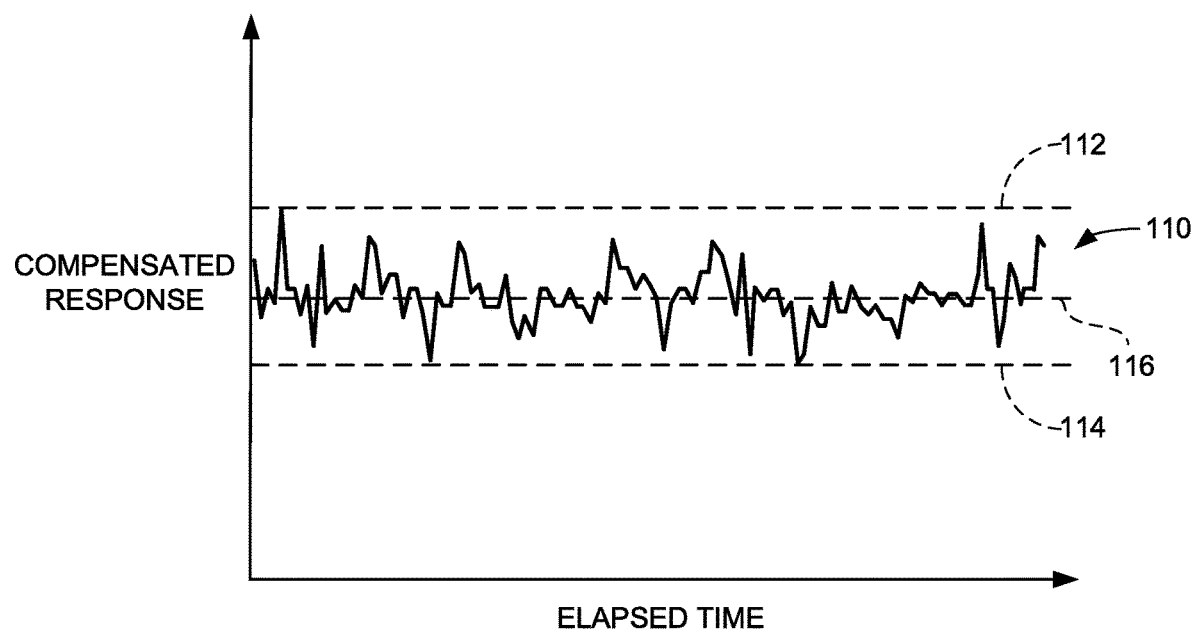

Accordingly, FIG. 1B shows another client I/O response curve 110. The curve 110 represents a client I/O response by the data storage device operated in a compensated mode of operation as variously embodied by the present disclosure. In some embodiments, the modes are selectable so that the same device can be configured to operate sometimes as in FIG. 1A and sometimes as in FIG. 1B. As before, the curve 110 represents completion rates for the associated client device.

An upper threshold 112 and lower threshold 114 mark maximum and minimum response levels over the depicted interval, and level 116 represents an average response rate for the curve. While the average level 116 in FIG. 1B may be somewhat lower than the average level 106 in FIG. 1A, the variations in the curve 110 are significantly reduced, leading to enhanced client performance.

Figure 2:
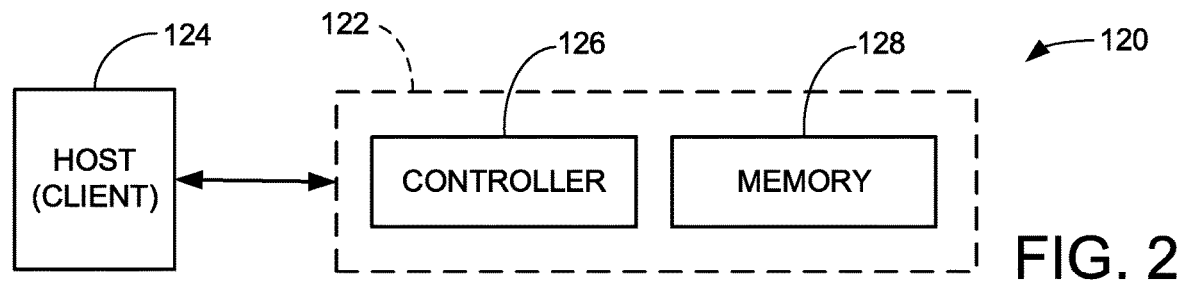
FIG. 2 is a functional block diagram of an exemplary storage device and client device.

FIG. 2 shows a data processing system 120 that includes a data storage device 122 coupled to a host (client) device 124 in accordance with some embodiments. The system 120 can be operated in accordance with the respective modes of FIGS. 1A and 1B as desired. The data storage device 122, also sometimes referred to as a storage device, includes a controller 126 and a memory 128. Generally, the controller 126 provides top level control to service access commands from the client device 124 to transfer data to and from the memory 128. The respective storage device 122 and client device 124 can take substantially any suitable form.

Figure 3:
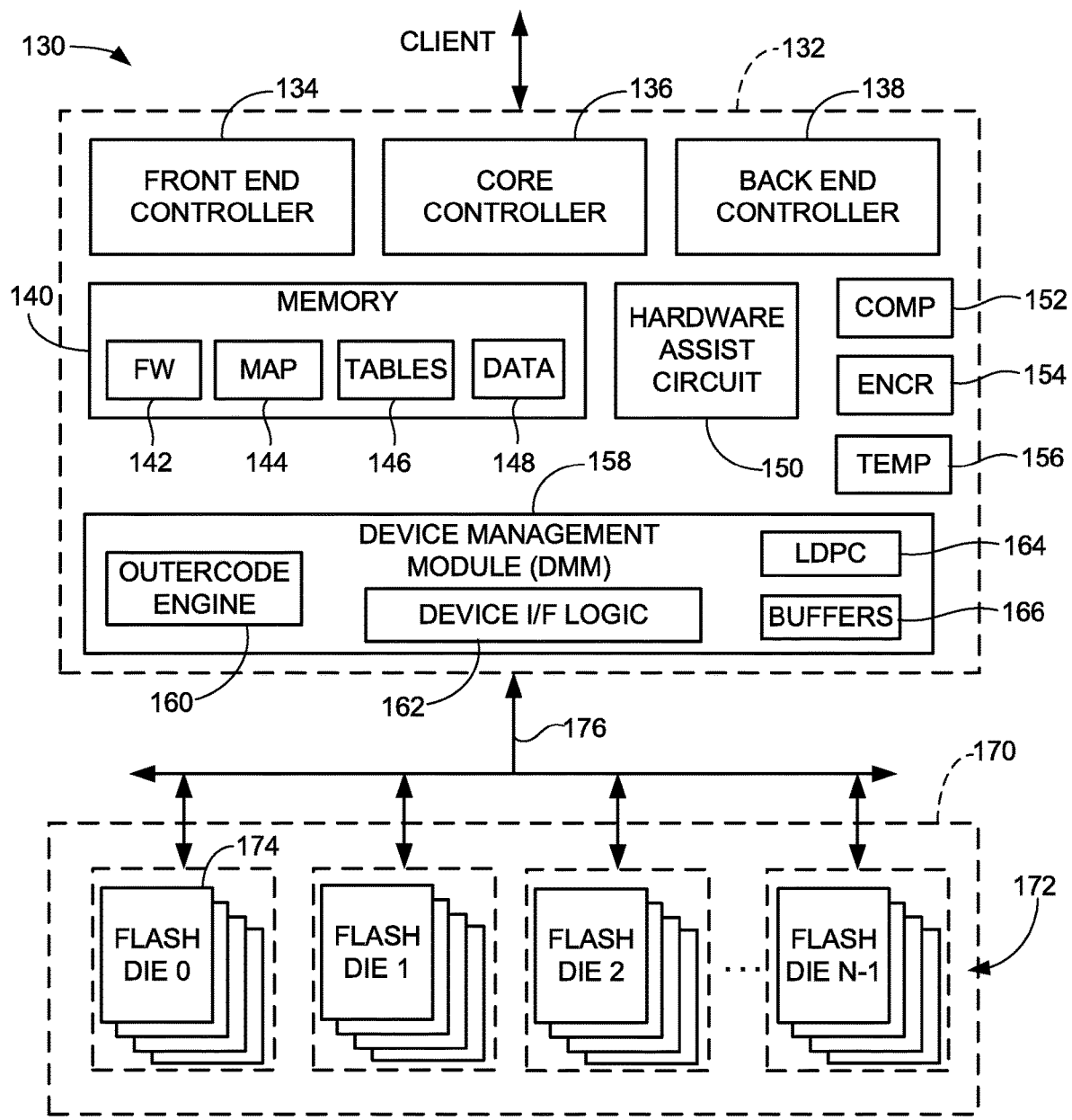
FIG. 3 shows a storage device characterized as a solid-state drive (SSD).

FIG. 3 is a functional block representation of another data storage device 130 in accordance with some embodiments. The storage device 130 corresponds to the storage device 122 in FIG. 2 and is characterized as a solid-state drive (SSD) which communicates with one or more client devices 124 via one or more. Peripheral Component Interface Express (PCIe) ports. The SSD is contemplated as utilizing 3D NAND flash memory as the main memory store (e.g., memory 128), although other forms of memory can be used.

In at least some embodiments, the SSD operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner). While aspects of various embodiments are particularly applicable to devices operated in accordance with the NVMe Standard, such is not necessarily required.

The SSD 130 includes a controller circuit 132 that corresponds to the controller 126 in FIG. 2. The controller circuit 132 has a front end controller 134, a core controller 136 and a back end controller 138. The front end controller 134 performs host I/F functions, the back end controller 138 directs data transfers with flash memory store and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including loaded firmware (FW) 142, map data 144, table data 146 and user data 148 in read/write buffers temporarily cached during host data transfers.

A non-processor based hardware assist circuit 150 may enable the offloading of certain memory management tasks by one or more of the controllers as required. The hardware circuit 150 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 132, such as a data compression block 152, an encryption block 154 and a temperature sensor block 156. These elements can be realized using hardware/firmware as required. The data compression block 152 applies lossless data compression to input data sets during write operations to enhance storage efficiency. It is contemplated albeit not required that all of the user data supplied for storage by the SSD 130 will be compressed prior to storage to the flash memory.

The encryption block 154 applies suitable encryption and other cryptographic processing to provide data security for the SSD. The temperature block 156 may include one or more temperature sensors that monitor and record temperatures of the SSD during operation.

A device management module (DMM) 158 supports back end processing operations. An outer code engine circuit 160 generates outer code for parity sets stored by the SSD. A device I/F logic circuit 162 handles the transfers of the parity sets. A low density parity check (LDPC) circuit 164 generates and use LDPC codes as part of an error detection and correction strategy to protect the data stored by the SSD 110. Various buffers 166 are made available and are allocated as necessary to support various read and write operations for host I/O accesses, GC operations and map updates.

A memory module 170 corresponds to the memory 128 in FIG. 2 and includes a non-volatile memory (NVM) in the form of a flash memory 172 distributed across a plural number N of flash memory dies 174. Flash memory control electronics (not separately shown in FIG. 2) may be provisioned to facilitate parallel data transfer operations via a number of channels (lanes) 176.

Figure 4:
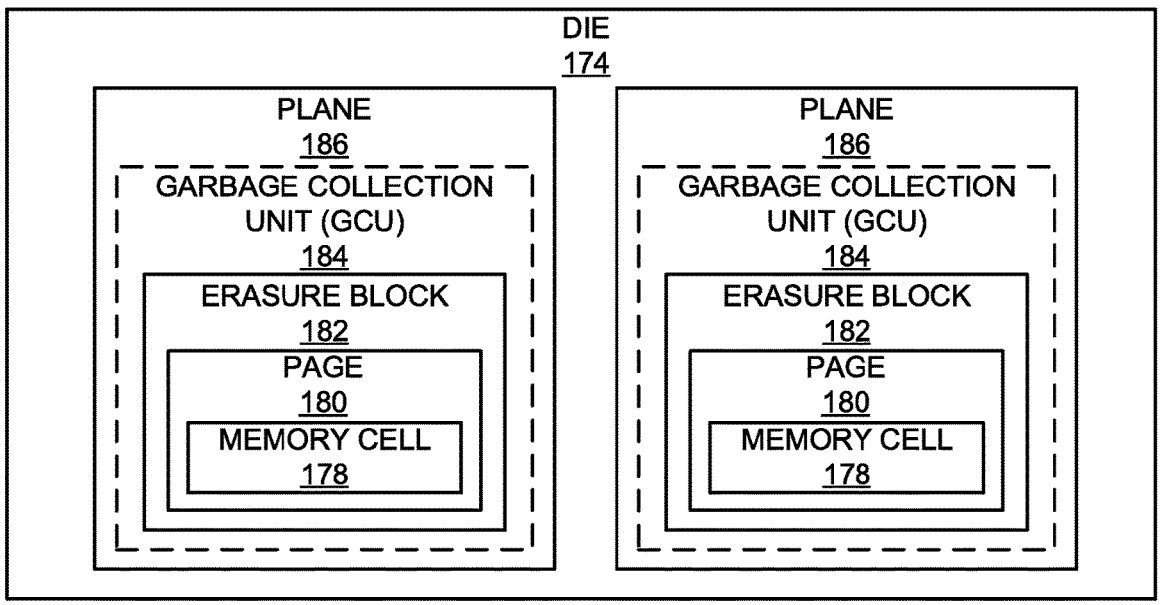
FIG. 4 shows a physical and logical layout of a flash die from FIG. 3 in some embodiments.

FIG. 4 shows a physical/logical arrangement of the various flash memory dies 174 in the flash memory 172 of FIG. 3 in some embodiments. Each die 174 incorporates a large number of flash memory cells 178. The cells may be arrayed in a two-dimensional (2D) or three-dimensional (3D stacked) arrangement with various control lines (e.g., source, bit, word lines) to access the cells.

Groups of cells 178 are interconnected to a common word line to accommodate pages 180, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), QLCs (four-level cells with four bits per cell), and so on. Generally, n bits of data can be stored to a particular memory cell 178 using 2n different charge states (e.g., TLCs use eight distinct charge levels to represent three bits of data, etc.). The storage size of a page can vary; some current generation flash memory pages are arranged to store 32 KB (32,768 bytes) of user data plus associated LDPC code bits.

The memory cells 178 associated with a number of pages are integrated into an erasure block 182, which represents the smallest grouping of memory cells that can be concurrently erased in a NAND flash memory. A number of erasure blocks 182 are turn incorporated into a garbage collection unit (GCU) 184, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection (GC) operation can be carried out to recycle the GCU. This includes identifying and relocating the current version data to a new location (e.g., a new GCU), followed by an erasure operation to reset the memory cells to an erased (programmed) state. The recycled GCU is returned to an allocation pool for subsequent allocation to begin storing new user data. In one embodiment, each GCU 184 nominally uses a single erasure block 182 from each of a plurality of dies 174, such as 32 dies.

Each die 174 may further be organized as a plurality of planes 186. Examples include two planes per die as shown in FIG. 4, although other numbers of planes per die, such as four or eight planes per die can be used. Generally, a plane is a subdivision of the die 174 arranged with separate read/write/erase circuitry such that a given type of access operation (such as a write operation, etc.) can be carried out simultaneously by each of the planes to a common page address within the respective planes.

Figure 5:
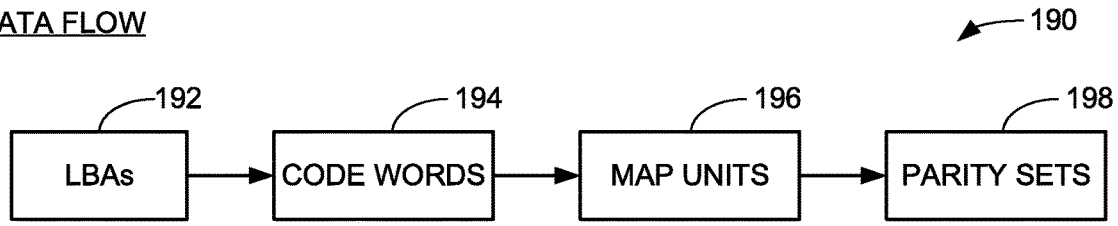
FIG. 5 illustrates a data flow for data stored by the SSD.

Input data from a client device such as 124 are stored in a manner such as illustrated by a data flow sequence 190 in FIG. 5. Other arrangements can be used. Blocks of user data with associated logical addresses such as logical block addresses, LBAs, are presented from the client at 192. The blocks are arranged into code words 194, which include user data bits and error correction code (ECC) bits to facilitate recovery during a read operation. The ECC bits may take the form of LDPC (low density parity check) bits.

A selected number of the code words may be arranged into mappable blocks, also referred to as map units (MUs) 196. Suitable sizes may be 4 KB (4096 bytes), 8 KB (8192 bytes), etc. although other sizes can be used. The map units are in turn arranged into pages, groups of which are arranged into parity sets 198.

In one non-limiting example, 31 pages of code words are combinatorially combined to generate a parity value as a $32^{nd}$ page, and then all 32 pages of the parity set is written to a selected GCU. The combinatorial function can be an exclusive-or (XOR) or some other suitable function. The parity value operates as outer code. By using a GCU size of 32 erasure blocks with one erasure block from each die, the outer code can facilitate data recovery even in the instance of a single die failure (e.g., a RAID 5 configuration). Other outercode arrangements can be used, including multiple sets of parity values (e.g., RAID 6, 7, etc.).

Figure 6:
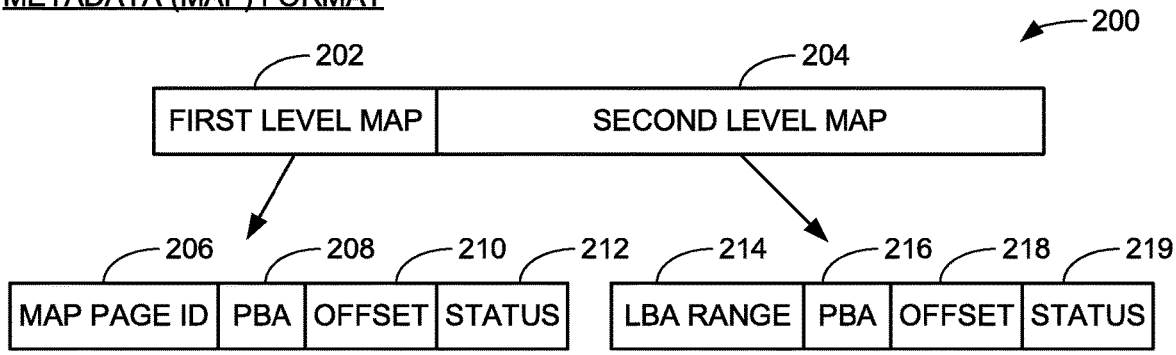
FIG. 6 is a format for map metadata used by the SSD.

The map units 196 represent groupings that enable the mapping system of the SSD to locate and retrieve the code words 194 stored to the flash memory. This is carried out using a two level map 200, as represented in FIG. 6. Other mapping structures can be used including a single level map, a multi-level map with more than two levels, etc., so that the example format in FIG. 6 is merely exemplary and is not limiting.

The map 200 includes a first level map 202 and a second level map 204. The second level map 204 operates as a flash transition layer (FTL) with a physical to logical association of addresses to enable location of the desired user data blocks. The first level map 202 indicates the locations of map descriptors (map page ID values) that in turn identify the locations of the map units 198 in the second level map 204. Some, most or all of the first and second level maps 202, 204 may be loaded to the local memory 140 for use by the controller 132 (see FIG. 2).

A typical data access sequence to service a client data access command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata is updated.

To this end, the entries in the first level map 202 may include a map page ID 206, a physical block address (PBA) 208, an offset 210 and a status 212. The entries in the second level map 204 may include an LBA range 214, a PBA 216, an offset 218 and a status 220.

As noted above, the second level map 204 describes all of the individual blocks of user data resident in, or that could be written to, the flash memory. The LBA values are sequential from a minimum value to a maximum value (e.g., from LBA 0 to LBA N with N being some large number determined by the overall data capacity of the SSD). Other logical addressing schemes can be used such as key-values, virtual block addresses, etc. While the LBA values may form a part of the entries, in other embodiments the LBAs may instead be used as an index into the associated data structure to locate the various entries.

The PBA values may be expressed in terms of array, die, garbage collection unit (GCU), erasure block, page, etc. The offset values may be a bit offset along a selected page of memory. The status value may indicate the status of the associated block (e.g., valid, invalid, null, etc.). Other control information can be incorporated as required.

Groups of entries in the second level map 204 are arranged into larger sets of data referred to herein as map pages. Some selected number of entries are provided in each map page. In one example, each map page can have a baseline value of 100 entries. Other groupings of entries can be made in each map page, including numbers that are a power of 2.

The second level map hence constitutes an arrangement of all of the map pages in the system. It is contemplated that some large total number of map pages will be necessary to describe the entire storage capacity of the SSD. Each map page has an associated map page ID value, which may be a consecutive number from 0 to M.

The first and second level maps 202, 204 are normally stored in the flash or other non-volatile memory. The maps may be written across different sets of the various dies. For redundancy, multiple copies may be written, and the copies are protected using suitable data protection techniques (e.g., LDPC code bits), other ECC encoding, outercodes, etc. In some schemes, the first level map 202 may be small enough to be loaded fully in a local memory (e.g., an internal SRAM area available to the controller, external DRAM, a local cache, etc.). Ideally, a full copy of the second level map 204 would also be loaded locally for use, such as in external DRAM, etc. However, if the size of the full second level map is too unwieldy, those portions required for use by the system will be retrieved and loaded to the local memory as needed.

Figure 7:
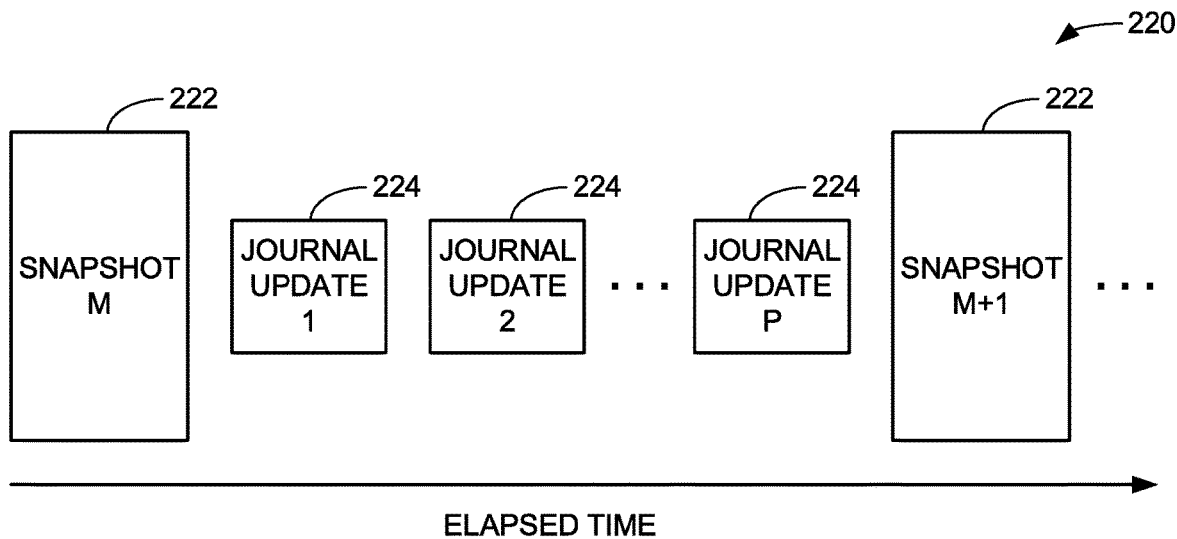
FIG. 7 shows an arrangement of the map metadata as a sequence of snapshots and intervening journal updates.

FIG. 7 represents a set of map metadata 220. It is contemplated that the metadata forms a portion of the second level map 204, although such is not required. The metadata 220 are arranged as a sequence of snapshots 222 and intervening journal updates 224. Each snapshot 222 represents the state of the associated metadata at a selected point in time. A series of journal updates 224 show changes to the most recent snapshot.

A new snapshot is formed by combining the most recent snapshot with the changes made by the journal updates that have been generated since the most recent snapshot. This is sometimes referred to as a replaying operation, as the updates are replayed to bring the snapshot up to date For example, in FIG. 7 the snapshot M+1 is formed by updating snapshot M with the changes provided by journal updates 1 through P. The number and frequency of journal updates that are accumulated before a new snapshot is generated is carried out on an adaptively adjusted basis in a manner to be explained below.

Figure 8:
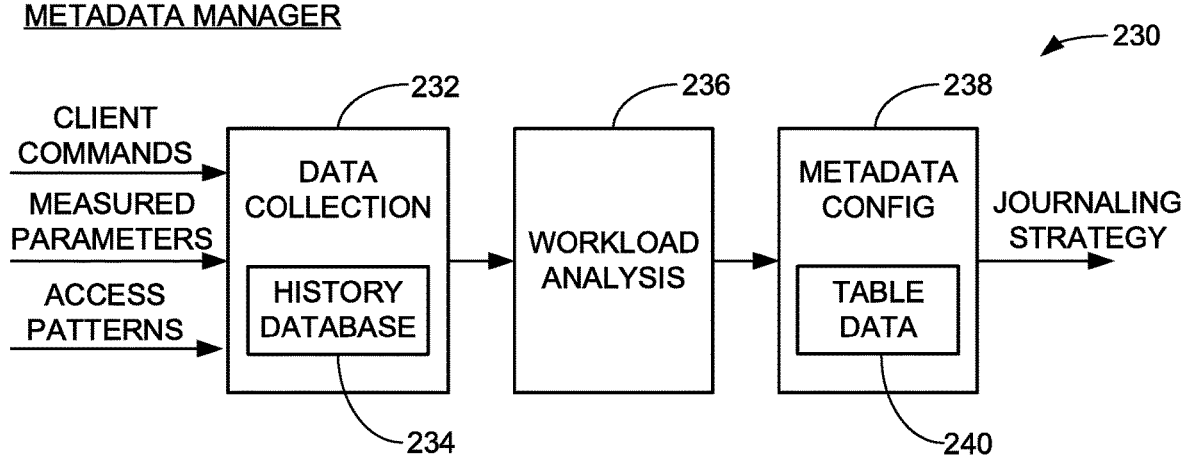
FIG. 8 is a functional block representation of a metadata manager circuit of the SSD in some embodiments.

FIG. 8 depicts relevant aspects of a metadata manager circuit 230. The metadata manager circuit 230 may form a portion of the controller 132 (FIG. 2), and may be realized in hardware and/or programming instructions (firmware) executed by a programmable processor.

The circuit 230 manages the map metadata used by the SSD by adaptively selecting a suitable journaling strategy for each of a number of different sections, or portions, of the metadata. To this end, the circuit includes a data collection module 232 that collects history data based on a number of system inputs. These can include client commands, various measured parameters, access patterns, etc. The history data can be of any suitable form and gives insight into the needs of the system from the client standpoint. The accumulated history data are stored in a history database 234 as a data structure in memory.

A workload analysis engine 236 uses the history data from the database 234 to characterize client workload trends. Without limitation, the client workload can be characterized in a number of useful ways, including as follows: sequential v. random accesses; identification of hot data v. cold data; the use of NVMe namespaces; the locality of data accesses, both logically and physically; big v. small data transfers; queue depths; instant v. historical accesses; write dominated v. read dominated accesses, and so on.

The characterization of the workload is thereafter used by a metadata configuration circuit 238 to select and implement a suitable journaling strategy for the metadata associated with each portion of the user data being managed by the SSD. One or more data structures (tables) 240 are implemented and maintained to enable the system to manage the metadata. A detailed explanation of the operation of each of these modules in FIG. 8 will now be provided, beginning with a review of FIG. 9.

Figure 9:
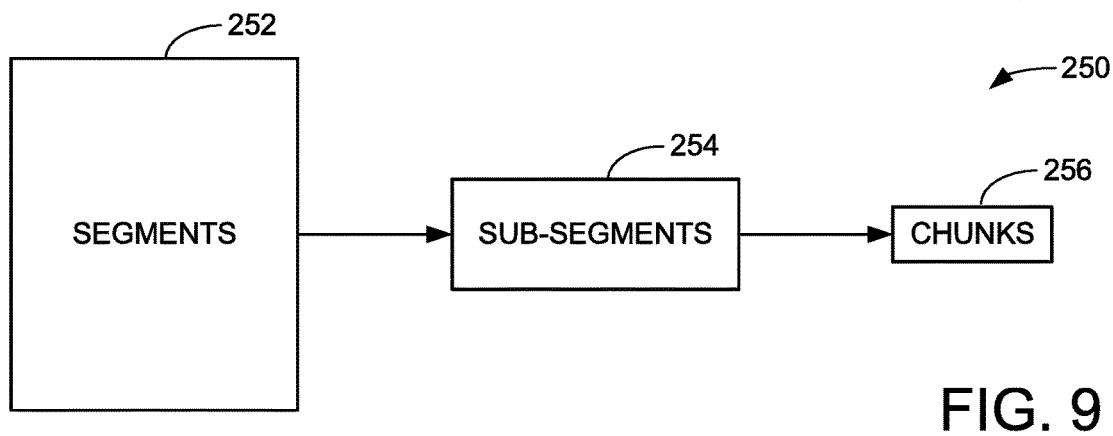
FIG. 9 represents an arrangement of a map metadata table.

FIG. 9 represents an exemplary format for a metadata map table 250. In this embodiment, the table is divided into a number of segments 252. The segments are formed by dividing up the overall available data storage capacity of the SSD on a logical basis, so that for a total range of logical addresses that can be used by the client (e.g., from LBA 0 to LBA N), each segment will generally encompass 1/X of this entire space. In one embodiment, X=32 so that each segment represents $1/32_{nd}$ of the available storage space in the drive. It is contemplated that each segment 252 will be of equal size, but the segments can have different sizes as required.

Each segment 252 is divided into 32 sub-segments 254, so that each sub-segment will describe $1/32^{nd}$ of the associated segment. Stated another way, each sub-segment describes a different $1/32^{nd}$ of the logical range encompassed by the associated segment. A snapshot and journal update arrangement as generally depicted in FIG. 7 is maintained for each sub-segment 254.

Each sub-segment 254 is further divided into smaller portions referred to herein as "chunks" 256. The chunks represent individually manageable units of the metadata. The metadata manager 230 (FIG. 8) sets the granularity of the chunks at a desired level. Without limitation, the chunks 256 for a given sub-segment 254 may range from around 100B (bytes) of user data to upwards of 64 KB (kilobytes) of user data or more. The size of each chunk may or may not be a power of two, as desired.

Figure 10:
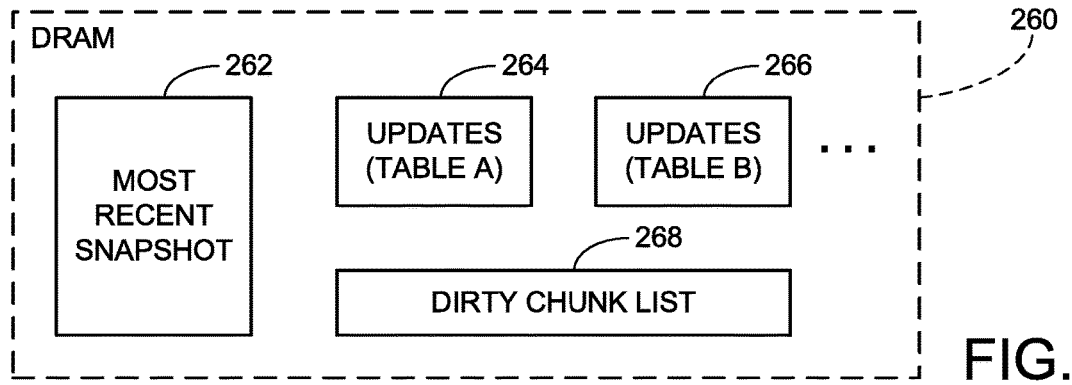
FIG. 10 illustrates an arrangement of the map metadata in a local memory of the SSD in some embodiments.

FIG. 10 depicts a portion of a local memory (e.g., DRAM) 260 to illustrate various metadata data structures maintained by the SSD 130 in some embodiments. These data structures correspond to the table data 240 in FIG. 8 and are provided for each sub-segment 254 in FIG. 9.

As shown in FIG. 10, the most recent snapshot of the metadata for the sub-segment is represented as a table 262. Updates are accumulated in a series of update tables, such as Tables A and B denoted at 264 and 266. Any number of additional tables (e.g., Tables C, D, E, etc.) can be utilized as required, depending on the rate of updates to the data described by the metadata. A dirty chunk list is maintained at 268. The dirty chunk list is also sometimes referred to as a journal update list.

An operational principle of the system is to try to write the smallest chunks of dirty metadata at the slowest rate. The sizes of the chunks as well as the rate at which the chunks are written are selected to balance TTR (time to ready) against reduced client I/O variability and write amplification (WA) during normal operation. Instead of simply updating the snapshot once a selected number of journal updates are accumulated, the metadata manager intelligently manages the updates so that the updates for some chunks are incorporated ("replayed") into the latest snapshot, while other updates for other chunks are maintained in a read-only journal table. Moreover, only the metadata showing the latest changes (e.g., dirty chunks) are written so that superseded updates are jettisoned.

Figure 11A:
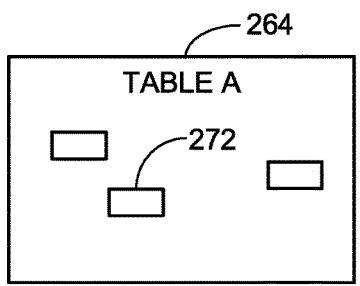
FIGS. 11A-11C show update tables from FIG. 10.
Figure 11B:
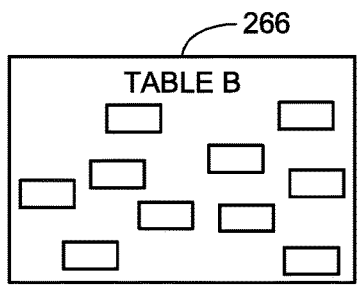
Figure 11C:
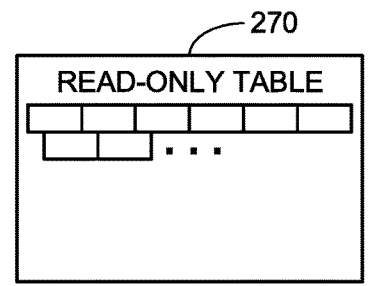

FIGS. 11A-11C generally illustrate operation of the system. FIGS. 11A and 11B correspond to Tables A and B from FIG. 10. FIG. 11C shows a read-only table 270. Blocks 272 in these figures represent metadata update entries for corresponding chunks. The metadata update entries 272 are the most recent (e.g., dirty) updates, and thus represent the current status of the associated metadata for the associated chunks. For this reason, the updates 272 are referred to as dirty chunks. The tables are consecutive in time (e.g., Table A was filled up prior to filling up Table B), although such is not necessarily required.

Table A shows relatively few dirty chunks as compared to Table B. It follows that the data during this period of time has undergone a large number of updates, so that relatively few of the entries in Table A are still valid. By contrast, Table B has a larger number of dirty chunks, indicating less subsequent client activity.

The metadata manager circuit 230 (FIG. 8) processes the dirty chunks in an appropriate manner. For example and not by way of limitation, the dirty chunks 272 in Table A may be replayed to update the most recent snapshot table 262, while the dirty chunks in Table B may be extracted and compressed into the read-only table 270. These respective operations serve to clear the tables, allowing new entries to be added.

While not necessarily required, in some embodiments the various metadata updates can be accumulated sequentially in the tables, and when each table is filled the metadata manager can operate to process the dirty chunks. While a separate read-only table is depicted in FIG. 11C, such operation is not necessarily required; the chunks that are not replayed can be compressed as the beginning entries in each table, the remaining older entries can be jettisoned and new entries can be added to the table. A linked list can maintain the locations of the most recent chunks among the respective tables.

Figure 12:
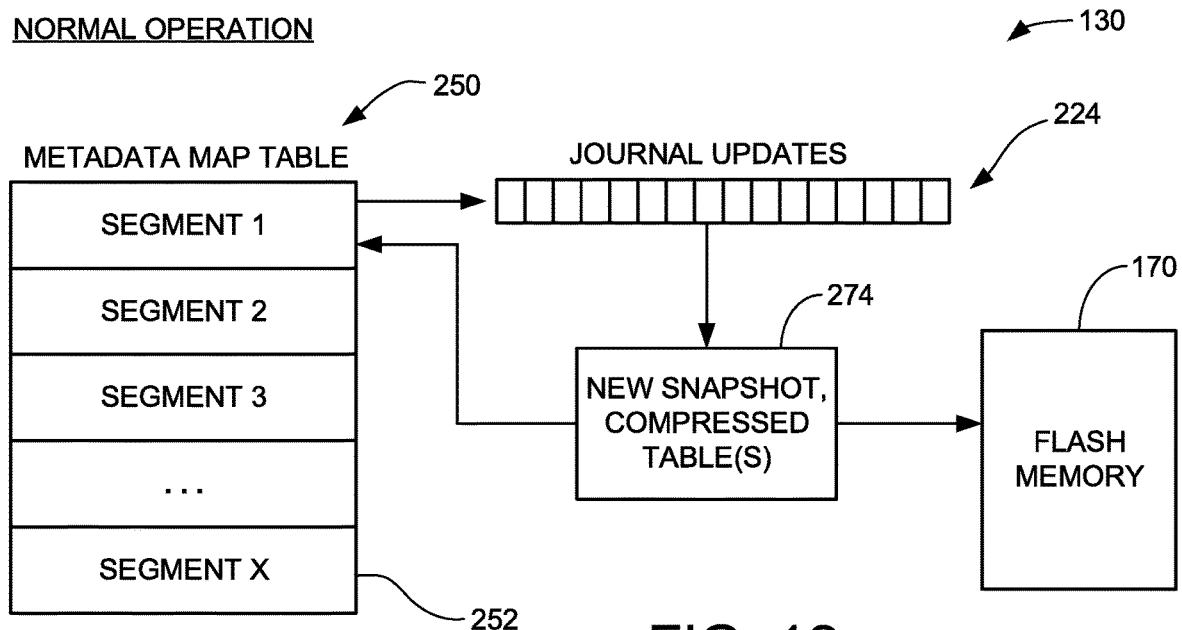
FIG. 12 illustrates metadata management during a period of normal operation for the SSD.
Figure 13:
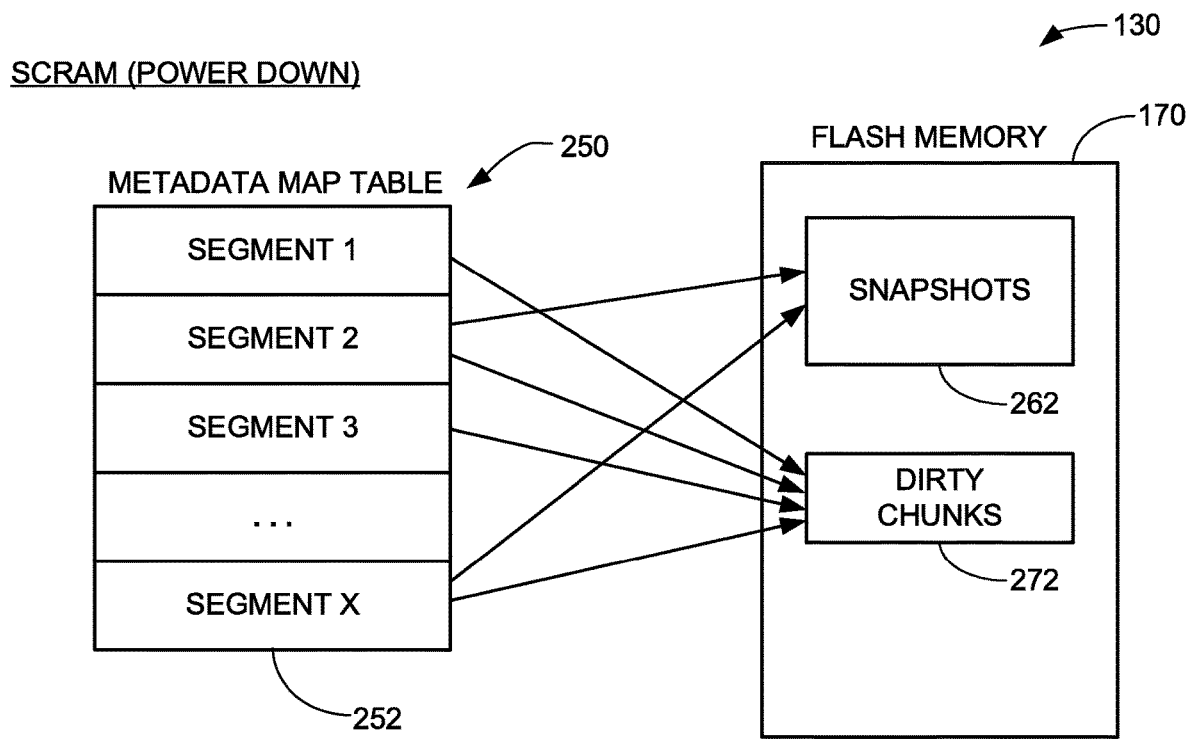
FIG. 13 illustrates a scram sequence during which the SSD is transitioned to a powered down state.
Figure 14:
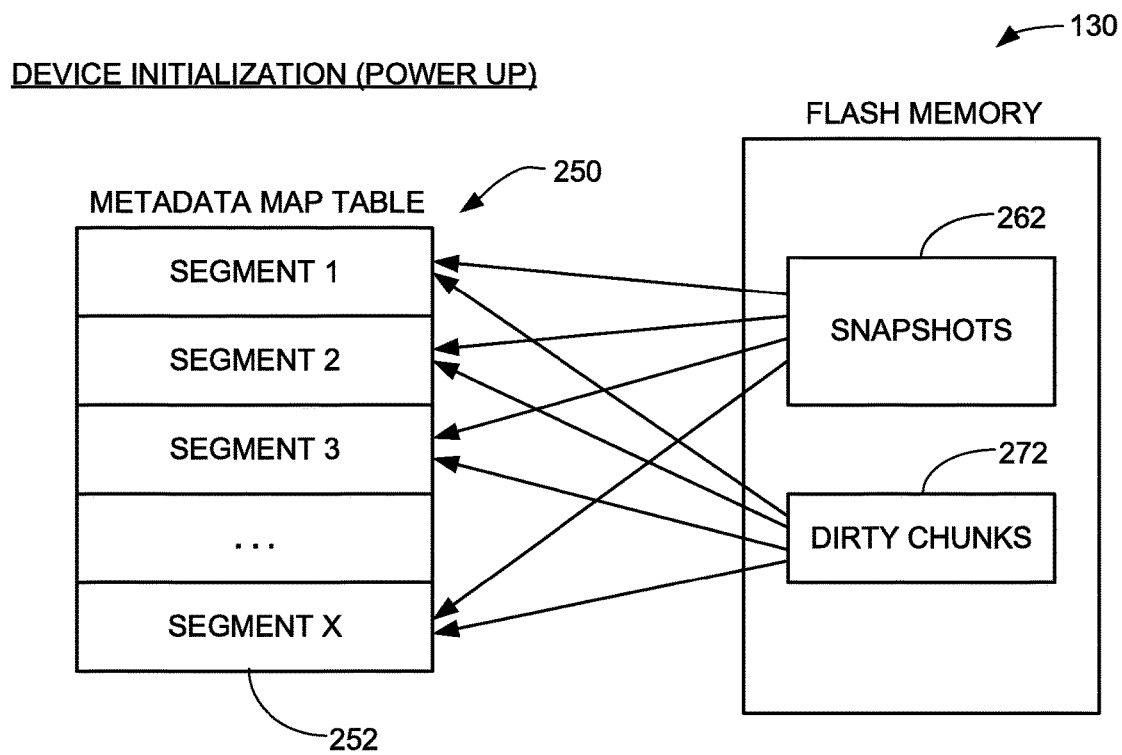
FIG. 14 illustrates an initialization sequence during which the SSD is transitioned to the normal operational state.

FIGS. 12-14 serve to illustrate the operation of a selected metadata journaling strategy during respective periods of normal operation, scram processing and initialization processing. As shown in FIG. 12, during normal processing the metadata management table 250 concurrently represents the state of the system for all of the segments 252 and sub-segments 254 in the system (see FIG. 9). Journal updates 224 in the form of dirty chunks 272 (FIG. 11A) are accumulated as described above. At appropriate times (operational block 274), the dirty chunks are replayed into the existing snapshots, compressed into read-only tables and/or copied (for backup redundancy) to the flash memory 170. Because only dirty updates are being written at the slowest acceptable rate to preserve data integrity, reduced WA and enhanced client I/O are achieved.

FIG. 13 depicts scram (power down) processing. As noted above, the term "scram" refers to the interval during which the controller 132 prepares the SSD to enter a deactivated state. Various steps need to be successfully accomplished, such as the saving of any pending write data to NVM, the updating and storage of the map metadata, the storage of various state parameters, and so on. A small amount of power may remain available to the controller, such as through the use of on-board power storage capacitors, etc., once a power down event has been detected. Nevertheless, the controller will tend to have limited power and time to carry out these operations before the device is fully deactivated.

It has been found at least in some cases that each additional increment of time (such as each second, sec) that the SSD or other storage device can use to process data during the scram interval tends to save essentially that same amount of increment of time during the subsequent reinitialization of the device. Efficient scram processing of the map metadata can thus allow the controller to utilize the remaining power for other important tasks, as well as enable the device to resume operation more quickly once the device is reactivated.

Accordingly, as shown by FIG. 13, the scram processing includes the writing of the most recent snapshot data structures 262 and dirty chunks 272 of metadata updates to the flash memory 170. Depending upon the available time, some of the chunks may be replayed to update the snapshots to reduce TTR during subsequent reinitialization. However, it is contemplated that the scram operation will not likely enable all of the dirty chunks to be replayed, so that a separate set of dirty chunks may be written. This is also true for any read-only tables such as 270.

FIG. 14 represents reinitialization processing of the device. During this sequence, power has been reapplied to the SSD 130 and the metadata manager circuit 230 operates to prepare the device for normal operation (FIG. 12). As part of the initialization processing, the most current snapshots 262 are loaded to the table 250, as well as the dirty chunks 272 and associated control information (dirty chunk list, history data, etc.). As desired, some or all of the dirty chunks 272 can be replayed into the loaded snapshots. Regardless, the system operates to minimize TTR since only the dirty chunks are loaded and the system is ready to resume operation without the need to fully update all of the snapshots.

Figure 15:
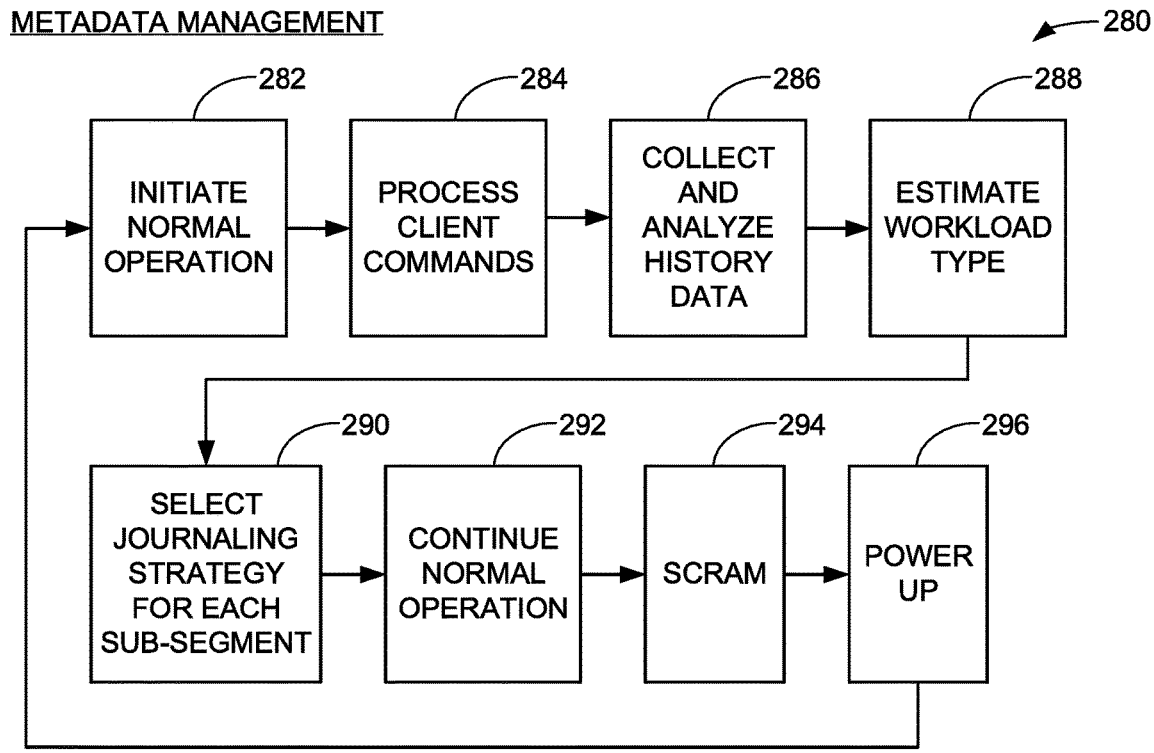
FIG. 15 is a metadata management sequence diagram to illustrate operation of the metadata manager circuit of FIG. 8 in some embodiments.

FIG. 15 is a metadata management sequence 280 to describe operation of the metadata manager circuit 230 (FIG. 8) in some embodiments. It will be recalled that in at least some embodiments the metadata manager collects history data to characterize a current workload for the SSD, and uses this as part of the adaptively selected metadata strategy.

Normal operation for the SSD is initiated at block 282. During this normal operation, various client commands are received and processed by the SSD, block 284. These client commands can include write commands to write (program) new data sets to the flash memory and read commands to read (retrieve) a copy of the previously stored data sets. The metadata is used to locate the data and is updated as required in a manner described above. While not separately shown in FIG. 15, background operations such as garbage collection, read voltage calibration operations, dummy reads, data relocations and consolidations, etc. are also carried out as required.

History data sets are collected and analyzed at block 286 to enable the manager circuit to estimate a current workload type. The workload represents the type of commands that are currently being supplied to the SSD, and can be characterized in a number of useful ways, including as follows: sequential v. random accesses; identification of hot data v. cold data; the use of NVMe namespaces; the locality of data accesses, both logically and physically; big v. small data transfers; queue depths; instant v. historical accesses; write dominated accesses v. read dominated accesses, and so on.

At block 290, the manager circuit 230 proceeds to select a suitable journaling strategy for each sub-segment 254 in the system. In some cases, different strategies will be selected for different portions of the memory. Each strategy can include granularity, chunk size, ratios of replays to read-only accumulations, table sizes, rate at which updates are accumulated before processing, and so on. It will be noted that once a chunk size is selected for a given sub-segment, this chunk size will generally need to be used until all of the dirty chunks have been replayed into a fully current snapshot. From that point, new granularities and other factors can be implemented. Generally, smaller chunks may be more suitable for random writes/reads, while larger chunks may be more suitable for more sequential style writes/reads, and so on.

Normal operation is thereafter continued as represented by block 292 using the implemented journaling strategy. This operation was discussed above in FIG. 12. At some point, a system shut-down will be detected, so that the system performs scram processing at block 294, as discussed above in FIG. 13. At some point after that, a system reinitialization will be detected, in which case power up processing is carried out at block 294, as discussed above in FIG. 14. It will be noted that upon system resumption, the previously selected journaling strategy can continue to be used, or a new journaling strategy can be selected based on a newly detected workload.

Figure 16:
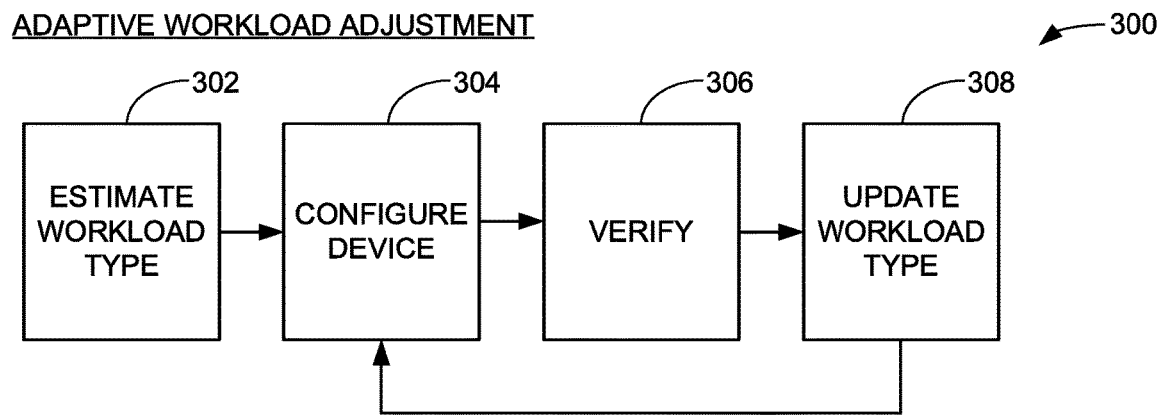
FIG. 16 is an adaptive workload adjustment sequence diagram to illustrate further operation of the metadata manager circuit of FIG. 8 in some embodiments.

FIG. 16 is an adaptive workload adjustment sequence 300. This is an additional routine that can be performed in conjunction with the routine of FIG. 15. FIG. 16 allows changes in workload to be detected, which in turn allows a new metadata journaling strategy to be adaptively selected during a continuous period of normal operation.

A first workload type is estimated at block 302. This can be carried out as described above in FIG. 15. The device is configured at block 304 based on this first workload type, and verified through continued operation at block 306. This can include a monitoring function to evaluate the appropriateness of the current metadata journaling strategy. For example, if more (or fewer) dirty chunks are being received than were expected, a different strategy may be implemented. This can include detection/selection of a new workload type at block 308, which feeds back to a new, more appropriate metadata journaling strategy as shown.

Figure 17:
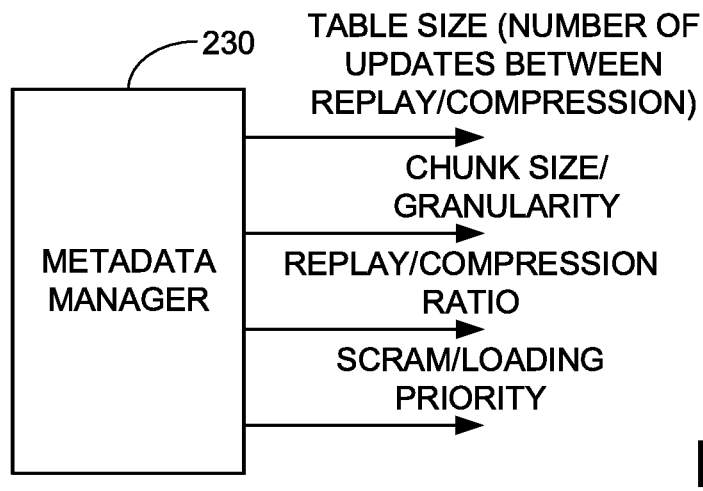
FIG. 17 illustrates various configuration adjustments that can be made by the metadata manager circuit in some embodiments.

FIG. 17 shows the metadata manager circuit 230 from FIG. 8 to illustrate various system configurations that may be selected for different metadata journaling strategies. Other metadata management adjustments can be implemented, so these are merely exemplary and non-limiting. As shown in FIG. 17, the circuit can implement different table sizes/update rates. This generally relates to how many updates are accumulated before the system proceeds to replay the dirty chunks (e.g., update the current snapshot) and/or accumulate the dirty chunks into one or more ready-only journal tables.

Individual chunks can be handled differently as desired. For a given dirty chunk, only some of the metadata entries may in fact have been updated (this is particularly likely for larger chunks), so replays and compression operations may further operate to extract only those entries from each chunk that have been updated. In some cases, it may be necessary to consolidate updates from previous chunks into a latest chunk. This is easily done since the dirty chunk list will indicate at any given time whether previous updates are in the tables for a given chunk.

Continuing with FIG. 17, the manager circuit 230 can further select appropriate chunk size and other granularity settings for the metadata. This can be based on workload or other system parameters. A replay/compression ratio can further be selected, indicating that some percentage X of the dirty chunks are combined into the existing snapshot and the remaining percentage 100-X of the dirty chunks are maintained in read-only journal form. X in this case can be any suitable value from 0 to 100, although a value of 20-50 may be appropriate depending on the environment. It will be appreciated that one strategy may use a ratio value of 20, another strategy may use a ratio value of 35, yet another may use 60, and so on. Additional ratios can further be selected during respective scram and initialization processing; for example, a first ratio may be used during normal processing, a second ratio during scram and a third ratio during initialization.

Finally, the manager circuit 230 can use the detected workload to prioritize the metadata for different segments during scram and loading (initialization) processing. Ranges of user data with demonstrated higher client interest during the previous session (prior to power down) may be given higher priority during the loading process (e.g., loaded to the table first) to reduce TTR.

Figure 18:
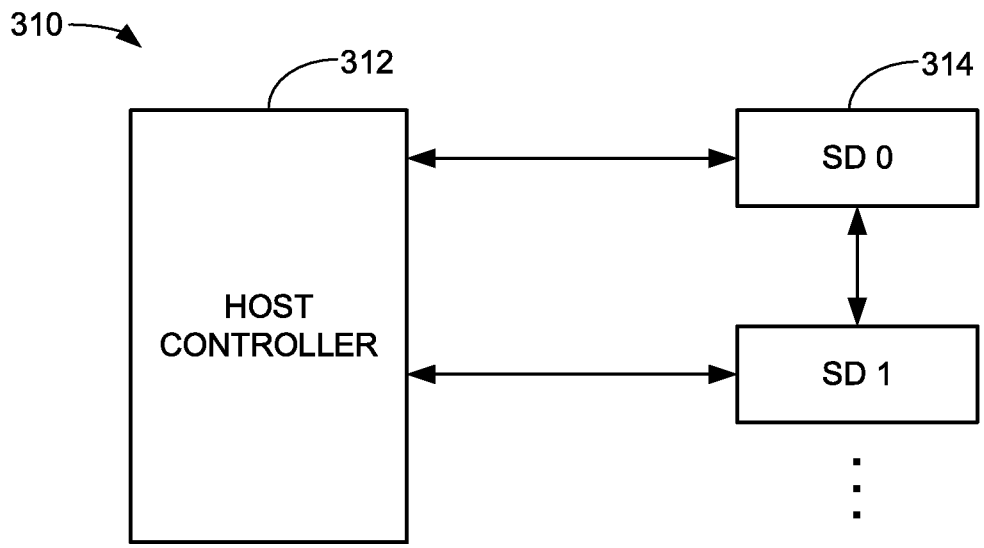
FIG. 18 shows a multi-device storage system that can be operated in accordance with some embodiments.

While the foregoing embodiments have been largely directed to the operation of an individual storage device (e.g., SSD 130), such is not necessarily limiting. FIG. 18 is a functional block representation of another storage system 310 in which a host controller 312 manages data transfers with an array of storage devices (SD 0, 1, etc.) 314. Each of the storage devices 314 can take the form of an SSD, or of some other type of device. In this case, metadata strategies can be selected at the host controller level, or individually tailored by the respective devices. Communications between devices can further inform the devices of expected workloads and other information that can enhance selection of the metadata strategy.

While various embodiments presented herein have been described in the context of solid-state drives (SSDs), it will be appreciated that the embodiments are not so limited, as other forms of storage devices such as hard disc drives (HDDs), hybrid data storage devices (HDSDs), etc. can be used as desired. It will be appreciated that HDDs tend to use rotatable magnetic recording media as the main memory store, and that HDSDs tend to use both rotatable magnetic recording media and solid state memory as the main memory store. The various embodiments have particularly suitability for use in an NVMe environment, including one that supports deterministic (IOD) modes of operation in which specified levels of performance are guaranteed for selected intervals.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
   storing user data in a non-volatile memory (NVM) responsive to read and write commands from a client device;
   maintaining map metadata in a local memory to describe locations in the NVM of the user data, the map metadata arranged in a metadata data structure having a snapshot, a plurality of journal updates, and a read-only table; and
   processing the plurality of journal updates by combining a first portion of the plurality of journal updates with the snapshot to generate an updated snapshot in the local memory, and concurrently storing a different second portion of the plurality of journal updates to the read-only table in the local memory;
   updating a journal update list that identifies the second portion of the plurality of journal updates in the read-only table; and
   subsequently servicing a client input/output (I/O) command via the metadata data structure, accessing metadata corresponding to the I/O command via both the updated snapshot and the read-only look-up table.

2. The method of claim 1, wherein the processing step further comprises writing a copy of the updated snapshot and the read-only table to the NVM while maintaining the updated snapshot and the read-only table in the local memory during a period of normal operation of the NVM.

3. The method of claim 1, further comprising identifying dirty journal updates from among the plurality of journal updates, the dirty journal updates characterized as most current version journal updates, wherein the processing step comprises combining and currently placing only the dirty journal updates while jettisoning the remaining journal updates from the local memory.

4. The method of claim 1, wherein the snapshot and plurality of journal updates describe a selected logical range of user data blocks stored to the NVM, wherein the selected logical range is divided into a plurality of fixed sized chunks, wherein each of the journal updates is associated with a corresponding one of the chunks, and the journal update list is characterized as a dirty chunk list that identifies chunks that have been modified since the point in time associated with the snapshot.

5. The method of claim 1, further comprising accumulating history data associated with the read and write commands issued by the client, identifying a workload type in relation to the accumulated history data, and adjusting a ratio of the first portion to the second portion of the journal updates in relation to the identified workload type.

6. The method of claim 5, wherein the identified workload is at least a selected one of a write dominated environment, a read dominated environment, a sequential access environment or a random access environment.

7. The method of claim 6, wherein the processing step is carried out once the plurality of journal updates reaches a selected accumulated number of journal updates, and wherein the selected accumulated number of journal updates is selected responsive to the identified workload type.

8. The method of claim 1, wherein the NVM is characterized as a NAND flash memory and the local memory is characterized as volatile memory used by a processor of a data storage device.

9. The method of claim 1, further comprising detecting a power down event,
   and writing the updated snapshot, the read-only table and the updated journal update list to the NVM.

10. An apparatus comprising:
    a non-volatile memory (NVM) configured to store user data in the form of addressable blocks from a client device;
    a local memory configured to store map metadata to describe locations of the addressable blocks in the NVM;
    a controller configured to access the map metadata to service client I/O commands to transfer the addressable blocks between the NVM and the client device; and
    a metadata manager circuit configured to arrange the map metadata as a snapshot and a plurality of metadata journal updates that describe changes to the snapshot, and to, responsive to the accumulation of a predetermined number of the metadata journal updates, replay a first selected portion of the plurality of metadata journal updates to generate an updated snapshot in the local memory and arrange a different second selected portion of the plurality of metadata journal updates into a separate read-only look-up table in the local memory, the controller configured to access metadata corresponding to a subsequent client I/O command via both the updated snapshot and the read-only look-up table.

11. The apparatus of claim 10, wherein the metadata manager circuit is further configured to identify a selected workload type responsive to the client I/O commands and to select the predetermined number of the metadata journal updates responsive to the selected workload type, the selected workload type comprising at least a selected one of a write dominated environment, a read dominated environment, a sequential access environment or a random access environment.

12. The apparatus of claim 10, wherein the map metadata describe a selected range of logical addresses of the addressable blocks in the NVM, and wherein the metadata manager circuit is further configured to divide the range of logical addresses into a plurality of chunks, and to accumulate a dirty chunk list comprising a listing of the chunks that have been updated since the snapshot, wherein only the journal updates for the chunks in the dirty chunk list are included in the first and second portions.

13. The apparatus of claim 10, wherein the metadata manager circuit further operates to write a copy of the updated snapshot and the read-only look-up table to the NVM.

14. The apparatus of claim 10, wherein during a power-down event in which the apparatus is transitioned from a normal mode of operation to a powered down state, the metadata manager circuit replays at least one of the journal updates in the read-only look-up table to generate a second updated snapshot and stores the second updated snapshot in the NVM.

15. The apparatus of claim 14, wherein during a subsequent initialization event in which the apparatus is transitioned from the powered down state back to the normal mode of operation, the metadata manager circuit replays at least one of the journal updates in the read-only look-up table to generate a third updated snapshot and loads the third updated snapshot to the local memory.

16. The apparatus of claim 10, wherein the metadata manager circuit selects a ratio of the first portion of the metadata journal updates used to generate the updated snapshot to the second portion of the metadata journal updates accumulated in the read-only look-up table responsive to the client I/O commands serviced by the controller.

17. The apparatus of claim 10, characterized as a solid-state drive (SSD), wherein the NVM is characterized as a flash memory, the local memory is characterized as DRAM, and the controller and the metadata manager circuit are realized by one or more programmable processors which execute associated firmware stored in a processor memory.

18. A solid-state drive (SSD), comprising:
a flash memory to provide a main non-volatile memory (NVM) store for user data;
a local volatile memory; and
a controller comprising a processor with associated programming stored in the local memory to manage data transfers of addressable blocks of user data between the flash memory and a client device responsive to client I/O commands using metadata arranged in the local memory as a snapshot and a plurality of journal updates, the controller selecting a metadata journaling strategy responsive to a detected workload from the client device, the controller implementing the selected metadata journaling strategy by combining a first subset of the plurality of journal updates with an existing snapshot to form an updated snapshot and by storing a different second subset of the plurality of journal updates thereof into a read-only journal table, a ratio of the first subset to the second subset determined by the selected metadata journaling strategy, the controller configured to subsequently access metadata corresponding to a subsequent client I/O command via both the updated snapshot and the read-only table.

19. The SSD of claim 18, wherein the controller arranges a logical range of the addressable blocks described by the snapshot into a plurality of chunks, each chunk having a size based on the detected workload.

20. The SSD of claim 18, wherein a rate at which the accumulated journal updates are processed by being divided into the first and second subsets and combined into the respective snapshot and journal table is determined by the selected metadata journaling strategy.

* * * * *